US008818909B2

(12) United States Patent
Bosworth et al.

(10) Patent No.: US 8,818,909 B2
(45) Date of Patent: Aug. 26, 2014

(54) LOCATION AWARE DEALS

(75) Inventors: Andrew Garrod Bosworth, San Mateo, CA (US); David Harry Garcia, Sunnyvale, CA (US); Kenneth M. Lau, Campbell, CA (US)

(73) Assignee: Facebook, Inc., Menlo Park, CA (US)

( * ) Notice: Subject to any disclaimer, the term of this patent is extended or adjusted under 35 U.S.C. 154(b) by 431 days.

(21) Appl. No.: 13/235,234

(22) Filed: Sep. 16, 2011

(65) Prior Publication Data

US 2013/0073371 A1 Mar. 21, 2013

(51) Int. Cl.
*G06Q 99/00* (2006.01)
*G06Q 30/00* (2012.01)

(52) U.S. Cl.
USPC ............. 705/319; 705/14.57; 705/14.58; 705/14.64

(58) Field of Classification Search
CPC .............. G06Q 30/0259; G06Q 30/0261
USPC ........................... 705/14.57, 14.58
See application file for complete search history.

(56) References Cited

U.S. PATENT DOCUMENTS

| | | |
|---|---|---|
| 8,108,501 B2 | 1/2012 | Birnie |
| 8,396,808 B2 | 3/2013 | Greenspan |
| 2008/0040281 A1 | 2/2008 | Chakraborty |
| 2008/0132251 A1 | 6/2008 | Altman |
| 2008/0133336 A1 | 6/2008 | Altman |
| 2008/0248815 A1 | 10/2008 | Busch |
| 2009/0047972 A1 | 2/2009 | Neeraj |
| 2009/0070219 A1 | 3/2009 | D'Angelo |
| 2009/0119167 A1 | 5/2009 | Kendall |
| 2009/0187463 A1 | 7/2009 | DaCosta |
| 2009/0287558 A1 | 11/2009 | Seth |
| 2010/0120450 A1 | 5/2010 | Herz |
| 2010/0280904 A1 | 11/2010 | Ahuja |
| 2011/0161130 A1 | 6/2011 | Whalin |
| 2012/0054001 A1* | 3/2012 | Zivkovic et al. ............. 705/14.1 |
| 2012/0089461 A1 | 4/2012 | Greenspan |
| 2012/0123830 A1* | 5/2012 | Svendsen et al. ............ 705/14.5 |
| 2012/0290389 A1* | 11/2012 | Greenough et al. ........ 705/14.53 |
| 2013/0027227 A1* | 1/2013 | Nordstrom .................... 340/990 |
| 2013/0030875 A1* | 1/2013 | Lee et al. ...................... 705/7.38 |
| 2013/0041754 A1* | 2/2013 | Gross .......................... 705/14.58 |
| 2013/0046632 A1* | 2/2013 | Grigg et al. ................. 705/14.58 |
| 2013/0046634 A1* | 2/2013 | Grigg et al. ................. 705/14.58 |
| 2013/0046635 A1* | 2/2013 | Grigg et al. ................. 705/14.58 |
| 2013/0054367 A1* | 2/2013 | Grigg et al. ................. 705/14.58 |
| 2013/0054368 A1* | 2/2013 | Grigg et al. ................. 705/14.58 |
| 2013/0054369 A1* | 2/2013 | Grigg et al. ................. 705/14.58 |

FOREIGN PATENT DOCUMENTS

| | | |
|---|---|---|
| JP | 2009-145935 | 12/2007 |
| KR | 10-2006-0062360 | 6/2006 |

OTHER PUBLICATIONS

U.S. Appl. No. 13/018,716, filed Feb. 1, 2011, Kendall.
U.S. Appl. No. 13/019,061, filed Feb. 1, 2011, Kendall.

(Continued)

*Primary Examiner* — Matthew T Sittner
(74) *Attorney, Agent, or Firm* — Baker Botts L.L.P.

(57) ABSTRACT

In one embodiment, a computer system, in response to a first user's request, creates a location-triggered gift for a second user and for a particular vendor location, determines the second user's location, and transmits information for redeeming the location-triggered gift at the particular vendor location to the second user if the second user is at the particular vendor location.

20 Claims, 6 Drawing Sheets

John bought Bill a Free Drink at Happy Friday Bar

(56) References Cited

OTHER PUBLICATIONS

Mark Hachman, "MobilePay: Your Phone is Your Credit Card", Sep. 28, 2010.
MG Siegler, "MobilePay May Be the Death of the Wallet. Yes, for Real This Time", Sep. 28, 2010.
International Search Report and Written Opinion for PCT/US2012/023514, Aug. 28, 2012.
International Search Report and Written Opinion for PCT/US2012/023496, Aug. 31, 2012.
Office Action for U.S. Appl. No. 13/018,716, Jan. 31, 2013.
Office Action for U.S. Appl. No. 13/019,061, Mar. 1, 2013.
Office Action for U.S. Appl. No. 13/018,716, Oct. 28, 2013.
Office Action for U.S. Appl. No. 13/019,061, Nov. 7, 2013.
Response to Office Action for U.S. Appl. No. 13/019,061, Feb. 7, 2014.
Response to Office Action for U.S. Appl. No. 13/018,716, Feb. 12, 2014.

* cited by examiner

US 8,818,909 B2

LOCATION AWARE DEALS

TECHNICAL FIELD

The present disclosure generally relates to location-based services, and more particularly, to systems that allow a first user to create a digital, location-triggered benefit for a second user.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interests. The social networking system may also create and store a record of a user's relationship with other users in the social networking system (e.g., social graph), as well as provide services (e.g., wall-posts, photo-sharing, or messaging) to facilitate social interaction between users in the social networking system. A geo-social networking system is a social networking system in which geographic services and capabilities are used to enable additional social interactions. User-submitted location data or geo-location techniques (e.g., mobile phone position tracking) can allow a geo-social network system to connect and coordinate users with local people or events that match their interests. For example, users can check-in to a place using a mobile client application by providing a name of a place (or selecting a place from a pre-established list of places). The geo-social networking system, among other things, can record information about the user's presence at the place and possibly provide this information to other users of the geo-social networking system.

SUMMARY

Particular embodiments relate to creating a location-triggered benefit for a user and for a particular vendor location, determining the user's location, and transmitting information for redeeming the location-triggered benefit at the particular vendor location to the user if the user is at the particular vendor location. These and other features, aspects, and advantages of the disclosure are described in more detail below in the detailed description and in conjunction with the following figures.

DETAILED DESCRIPTION

Figure 1:
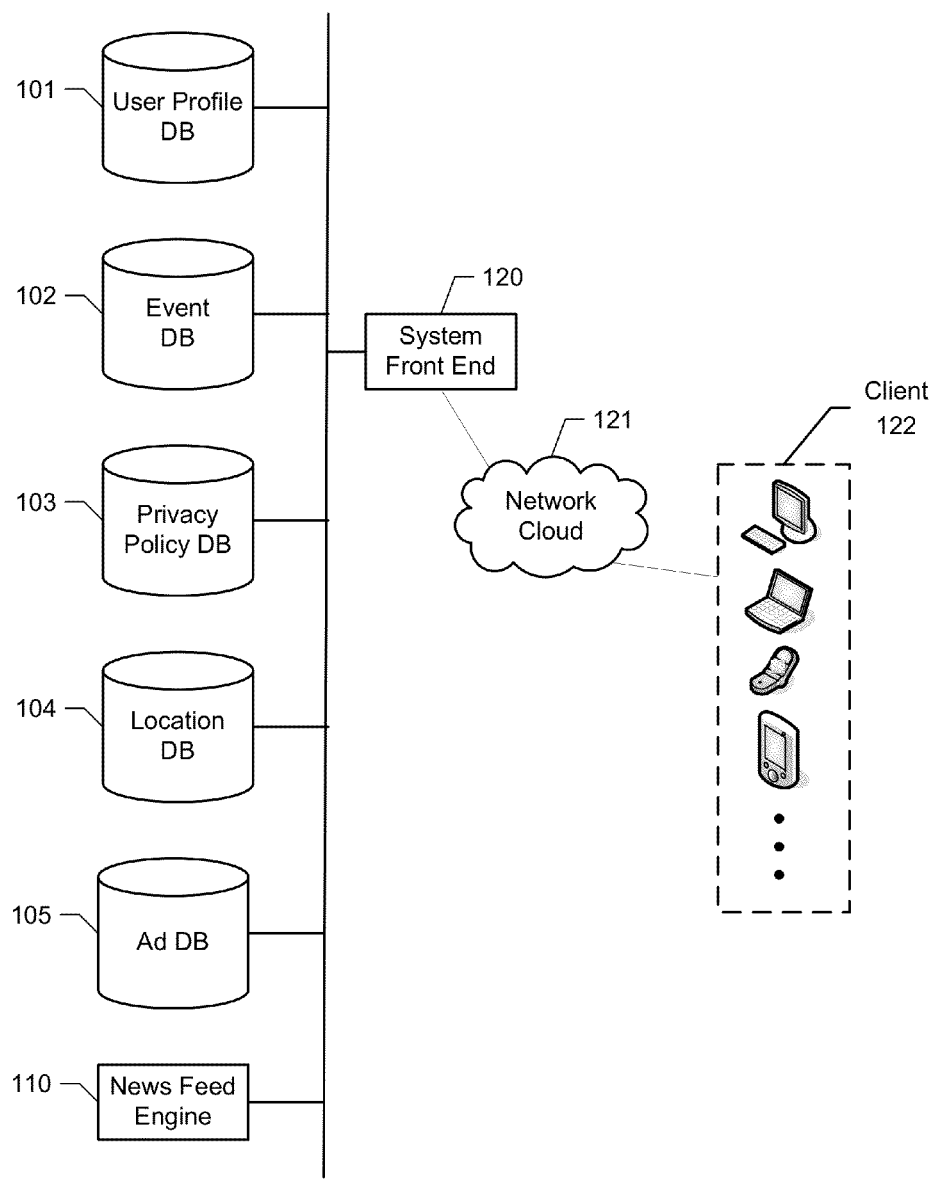
FIG. 1 illustrates an example social networking system.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item indexable and searchable on the Internet). A user may choose a default privacy setting for all user data that is to be posted. Additionally, a user may specifically exclude certain entities from viewing a user datum or a particular type of user data.

The social networking system may maintain a database of information relating to geographic locations or places. Places may correspond to various physical locations, such as restaurants, bars, train stations, airports and the like. In one implementation, each place can be maintained as a hub node in a social graph or other data structure maintained by the social networking system, as described in U.S. patent application Ser. No. 12/763,171, which is incorporated by reference herein for all purposes. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The social networking system may automatically checks in a user to a place based on the user's current location and past location data, as described in U.S. patent application Ser. No. 13/042,357 filed on Mar. 7, 2011, which is incorporated by reference herein for all purposes. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. The check-in activity may also be displayed on a user profile page and in news feeds provided to users of the social networking system.

Still further, a special purpose client application hosted on a mobile device of a user may be configured to continuously capture location data of the mobile device and send the location data to social networking system. In this manner, the social networking system may track the user's location and provide various recommendations to the user related to places that are proximal to the user's location or current trajectory or that are frequented by the user. In one implementation, a user may opt in to this recommendation service, which causes the client application to periodically post location data of the user to the social networking system.

A social networking system may maintain a database of advertisements from advertisers, and generate and communicate advertisements to users of the social networking system. An advertisement may comprise information of an advertiser or a vendor (e.g., a name, one or more locations, etc.), advertising content (e.g., a promotional message), and multimedia data (e.g., graphic arts, photos, video clips). An advertisement may include a promotional deal such as a redeemable coupon, a redeemable credit, a redeemable gift voucher, or a discount on products or services from a vendor. The social networking system may increase effectiveness of advertising by providing an advertisement targeted to a user who is likely to be interested in the advertisement. U.S. application Ser. No. 12/195,321, incorporated by reference in its entirety for all purposes, describes a system that selects advertisements by matching targeting criteria of advertisements and a user's profile information and past actions, and presents the selected advertisements to the user. The social networking system may also generate and communicate advertisements to a user based on the user's social graph information. U.S. application Ser. No. 12/193,702 describes a system that selects advertisements for a targeted user by matching targeting criteria of advertisements and past actions of another user connected to the targeted user, and presents information about the matched action and the selected advertisements to the targeted user. The social networking system may increase effectiveness of advertising by providing an advertisement targeted to a user who is at or near a vendor location. U.S. patent application Ser. No. 13/018,716, incorporated by reference herein in its entirety for all purposes, describes a system that generates a ranked list of places near a user's location where one or more of the places is associated with an advertisement, and presents the ranked list of places to the user.

A social networking system may support a news feed service. A news feed is a data format typically used for providing users with frequently updated content. A social networking system may provide various news feeds to its users, where each news feed includes content relating to a specific subject matter or topic. Various pieces of content relating to a particular topic may be aggregated into a single news feed. The topic may be broad such as various events related to users within a threshold degree of separation of a subject user, and/or updates to pages that a user has liked or otherwise established a subscriber relationship. Individual users of the social networking system may subscribe to specific news feeds of their interest. U.S. Pat. No. 7,669,123, incorporated by reference in its entirety for all purposes, describes a system that can be used to dynamically provide a news feed in a social networking system. A group of related actions may be presented together to a user of the social networking system in the same news feed. For example, a news feed concerning an event organized through the social networking system may include information about the event, such as its time, location, and attendees, and photos taken at the event, which have been uploaded to the social networking system. U.S. application Ser. No. 12/884,010, incorporated by reference in its entirety for all purposes, describes a system that can be used to construct a news feed comprising related actions and present the news feed to a user of the social networking system.

FIG. 1 illustrates an example social networking system. In particular embodiments, the social networking system may store user profile data and social graph information in user profile database 101. In particular embodiments, the social networking system may store user event data in event database 102. For example, a user may register a new event by accessing an application to define an event name, a time and a location, and cause the newly created event to be stored in event database 102. For example, a user may register with an existing event by accessing a client application to confirming attending the event, and cause the confirmation to be stored in event database 102. In particular embodiments, the social networking system may store user privacy policy data in privacy policy database 103. In particular embodiments, the social networking system may store geographic and location data in location database 104. In particular embodiments, the social networking system may store advertisement data in advertisement database 105. For example, a vendor may store advertisement content (e.g., advertising messages, promotional deals, graphic arts, video clips) and related information (e.g., locations, targeting criteria) in advertisement database 105. For example, a vendor may store promotional deals data (e.g., redeemable coupon, credit, or gift voucher, a discount on products or services from a vendor) and related information (e.g., locations, effective duration) in advertisement database 105. In particular embodiments, databases 101, 102, 103, 104, and 105 may be operably connected to the social networking system's front end 120 and news feed engine 110. In particular embodiments, the front end 120 may interact with client device 122 through network cloud 121. For example, the front end 120 may be implemented in software programs hosted by one or more server systems. For example, each database such as user profile database 101 may be stored in one or more storage devices. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet, a corporate intranet, a virtual private network, a local area network, a wireless local area network, a wide area network, a metropolitan area network, or a combination of two or more such networks) over which client devices 122 may access the social network system.

In particular embodiments, location database 104 may store an information base of places, where each place includes a name, a geographic location and meta information (such as the user that initially created the place, reviews, comments, check-in activity data, and the like). Places may be created by administrators of the system and/or created by users of the system. For example, a user may register a new place by accessing a client application to define a place name and provide a geographic location and cause the newly created place to be registered in location database 104. As discussed above, a created place may correspond to a hub node, which an administrator can claim for purposes of augmenting the information about the place and for creating ads or other offers to be delivered to users. In particular embodiments, system front end 120 may construct and serve a web page of a place, as requested by a user. In some embodiments, a web page of a place may include selectable components for a user to "like" the place or check in to the place. In particular embodiments, location database 104 may store geo-location data identifying a real-world geographic location of a user associated with a check-in. For example, a geographic location of an Internet connected computer can be identified by the computer's IP address. For example, a geographic location of a cell phone equipped with cellular, Wi-Fi and/or GPS capabilities can be identified by cell tower triangulation, Wi-Fi positioning, and/or GPS positioning. In particular embodiments, location database 104 may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, additional information of a place can be business hours, photos, or user reviews of the place. In one embodiment, location database 104 may store a set of geographic locations corresponding to multiple physical locations associated with a place (e.g., a place with a large geographical area such as a national park or an airport). For example, a set of geographic locations associated with a place may comprise a plurality of GPS locations, wherein each GPS location corresponds to a place check-in from a user. In particular embodiments, location database 104 may store a user's location data. For example, a user can create a place (e.g., a new restaurant or coffee shop) and the social networking system can store the created place in location database 104. For example, location database 104 may store a user's check-in activities. For example, location database 104 may store a user's geographic location provided by the user's GPS-equipped mobile device.

In particular embodiments, news feed engine 110 may access user profile database 101, event database 102, and location database 104 for data about a particular user of the social networking system, and assemble a list of one or more activities as news items about the particular user. In particular embodiments, news feed engine 110 may access privacy policy database 103 and determine a subset of news items based on one or more privacy settings by the particular user. In particular embodiments, news feed engine 110 may compile a dynamic list of a limited number of news items about the particular user in a preferred order (i.e., a news feed). In particular embodiments, news feed engine 110 may provide links related to one or more activities in the news items, and links providing opportunities to participate in the activities. For example, a news feed about a user can comprise the user's wall posts, status updates, comments on other users' photos, and a recent check-in to a place (with a link to a web page of the place). In other embodiments, news feed engine 110 may access user profile database 101, event database 102, and location database 104 and compile a dynamic list of a number of news items about a group of related actions received from users of the social networking system (i.e., a news feed). For example, a news feed can comprise an event that a user may schedule and organize through the social networking system (with a link to participate the event), check-ins at a specific geographical location of the event by the user and other participants of the event, messages about the event posted by the user and other participants of the event, and photos of the event uploaded by the user and other participants of the event.

Ordinarily, when a first user acquires a redeemable certificate (e.g., a gift card, a discount coupon) from a vendor for a second user, the first user can provide the redeemable certificate to the second user at any location and/or at any occasion. For example, John may purchase a gift card from a coffee shop for a co-worker Bill, and present the gift card to Bill at work. Particular embodiments herein describe methods of creating a location-triggered gift (in digital form) for a particular user and for a particular vendor location, wherein the gift is accessible to the particular user only when the particular user is at or near the particular vendor location. For example, a first user may purchase a gift (e.g., a "Free Drink" coupon) from a particular bar for a second user. Instead of passing the gift to the second user, particular embodiments herein may only transmit the gift to the second user when the second user is at the particular bar. For example, after the first user purchases the gift for the second user, the second user can be notified (e.g., by an email) about the gift from the first user. Alternatively, the gift can be a surprise left for the second user to discover the next time the second user visits the particular bar.

Figure 2:
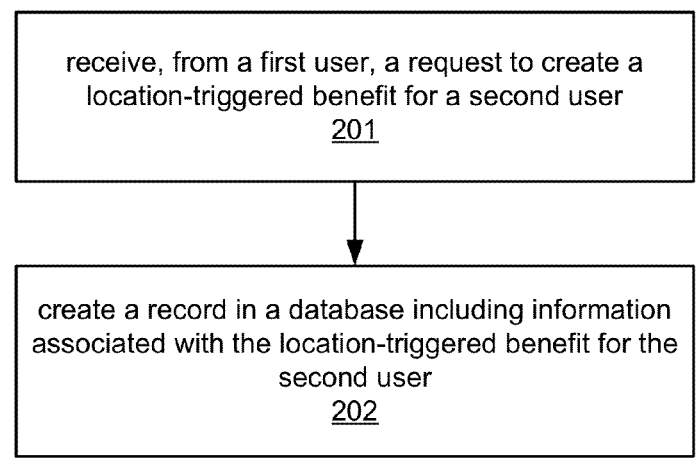
FIG. 2 illustrates an example method of creating a location-triggered benefit.

FIG. 2 illustrates an example method of creating a location-triggered benefit for a particular user and for a particular vendor location. FIG. 2 may be implemented by a location-triggered gift process hosted by one or more computing devices of a social networking system. In particular embodiments, the location-triggered gift process may receive from a first user, a request to create a location-triggered benefit for a second user (201). In particular embodiments, the location-triggered benefit may be a credit, a coupon, and/or a gift voucher redeemable from the vendor. In particular embodiments, the location-triggered benefit may be a discount on products or services from the vendor. In particular embodiments, the location-triggered benefit may be redeemable from a vendor at a vendor location. A vendor location may be a retail location of a vendor. For example, a Starbucks store in San Francisco, Calif. is a vendor location of Starbucks Corporation. For example, a store front of a bakery is a vendor location of the bakery.

In particular embodiments, a first user may request a location-triggered benefit redeemable at a particular vendor location while being at or near the particular vendor location. For example, a special-purpose client application hosted by the first user's GPS-equipped mobile device can retrieve from the social networking system a ranked list of places near the first user's current GPS location, as described in U.S. patent application Ser. No. 13/018,716. The first user can select a place corresponding to a vendor location from the ranked list, causing the special-purpose client application to transmit to the social networking system a request for a location-triggered benefit redeemable at the vendor location. For example, the first user can access a map with a current GPS location displayed in graphical user interface of an application hosted by the first user's GPS-equipped mobile device and select a vendor location in the map, causing the application to transmit to the social networking a request for a location-triggered benefit redeemable at the vendor location. For example, the first user may check in to a place corresponding to a vendor location near the first user's current location (e.g., based on current GPS coordinates) by accessing a mobile client application hosted by the first user's GPS-equipped mobile device, and be presented a web page for the vendor location. The first user may request a location-triggered benefit (e.g., by selecting a "Buy a gift for your friend!" icon in the web page), causing the mobile client application to transmit to the social networking system a request for a location-triggered benefit redeemable at the vendor location. For example, the first user may acquire a location-triggered benefit from a point-of-sales (POS) system at a vendor location, causing a retail application hosted by the POS system to transmit a request to the social networking system for a location-triggered benefit redeemable at the vendor location. For example, the first user may use a QR code (or bar code) reader software hosted by the first user's mobile phone to access a QR code displayed with a product/service (e.g., a coffee mug, an oil change service) at a vendor location, causing a special-purpose application hosted by the first user's mobile phone to transmit to the social networking system a request for a location-triggered benefit redeemable at the vendor location (e.g., "A free coffee mug if you visit this vendor location", "50% off your next oil change service at this vendor location").

In other embodiments, a first user may request a location-triggered benefit redeemable at a particular vendor location of a vendor from another location associated with the particular vendor location. For example, a first user may access a web page of the vendor and acquire a location-triggered benefit redeemable at the particular vendor location. For example, a first user may acquire a location-triggered benefit redeemable at the particular vendor location from a POS system at another retail location. In one embodiment, the location-triggered gift process may access data indicating the first user's current location (e.g., most recent GPS coordinates stored in location database 104, an IP address of an access point for the first user's network connection, location data for the POS system described above), and deny a request from the first user a location-triggered benefit redeemable at a particular vendor location, if the first user's is not at or near the particular vendor location.

In particular embodiments, the request for the location-triggered benefit may comprise one or more second users intended for the location-triggered benefit. For example, after the first user select a "Buy a gift for your friend!" icon in the web page of the vendor location as described above, the first user may be presented with a dialog box and enter in the dialog box user identifiers of the social networking system of one or more second users, causing the client application to transmit to the social networking system the request for a location-triggered benefit including the user identifiers of the one or more second users. The social networking system may also suggest to the first user one or more users as recipients of the location-triggered benefit. For example, the first user may check in to a place corresponding to a vendor location near the first user's current location by accessing a mobile client application hosted by the first user's GPS-equipped mobile device as described above. In response to the first user's check-in, a server-side process of the social networking system may access user profile database 101 and location database 104 for one or more users (e.g., one or more first user's social contacts) who have recently and/or frequently been to the vendor location, construct a place page (for the vendor location) including a suggestion to request location-triggered benefits for the one or more users (e.g., "Your friend John comes here often. Surprise him with a free coffee the next time he visits."), and present the place page to the first user in a graphical user interface of the mobile client application. The first user can confirm one or more users as suggested by the social networking system, causing the mobile client application to transmit to the social networking system the request for a location-triggered benefit including one or more users confirmed by the first user as recipients of the location-triggered benefit. In other embodiments, the first user may limit access to the location-triggered benefit based on one or more configurable rules that consider social proximity between the first user and an intended recipient of the location-triggered benefit. For example, the first user can limit access to the location-triggered benefit to users who are within a threshold degree of separation from the first user (e.g., the first user's first-degree social contacts, or users who are within two degrees of separations from the first user). For example, the first user can limit access to the location-triggered benefit to users who are in a particular group or share a common interest (e.g., users who went to the same college, users who like a place page of a particular sports team). In one embodiments, the social networking system may specify one or more default rules for a location-triggered benefit (e.g., accessible to the requesting user's first-degree social contacts).

In particular embodiments, the request for the location-triggered benefit may include one or more particular benefits (e.g., a fifty-percent off coupon, a $20 gift voucher, a free drink coupon) selected by the first user. For example, the first user may check in to a place corresponding to a vendor location near the first user's current location by accessing a mobile client application hosted by the first user's GPS-equipped mobile device as described above. In response to the first user's check-in, system front end 120 may access advertisement database 105 for a list of promotional deals at the vendor location, construct a place page (for the vendor location) including the list of promotional deals as selectable icons, and present the place page to the first user in a graphical user interface of the mobile client application. The first user may select one or more location-triggered benefits from the list of promotional deals, causing the mobile client application to transmit to the social networking system a request for the selected location-triggered benefits. Additionally, the first user may specify with the request an effective time duration for a selected location-triggered benefit. For example, the first user may specify that a free drink coupon at a bar for a second user may be valid only at the day of the second user's birthday. The first user may also specify one or more notification options when the location-triggered benefit is created (e.g., an email or SMS message sent to the second user about the newly created location-triggered benefit) and/or when the second user accesses the location-triggered benefit (e.g., an email to the first user, or a post to the first user's and the second user's profile page about the second user having just accessed the location-triggered benefit). Furthermore, the first user may include with the request for the location-triggered benefit a personal message for the second user when the location-triggered benefit is created (e.g., "I got a free latte for you at Café Du Nord.") and/or when the second user accesses the location-triggered benefit (e.g., "Surprise!"). For example, the first user may include with the request for the location-triggered benefit a message comprising one or more clues for finding the vendor location associated with the location-triggered benefit (e.g., "Remember where we had the birthday party for Bill?").

In particular embodiments, the location-triggered gift process may create a record including information associated with the location-triggered benefit for the second user, and store the record in location database 104 (202). For example, the location-triggered gift process may create a record comprising user identifiers of the first user and the second user, the vendor location, a location-triggered benefit, and an effective time duration of the location-triggered benefit, and store the record in location database 104. In one embodiment, the location-triggered gift process may store the record in a local data store at the vendor location. For example, the location-triggered gift process may transmit the record to a POS system (or a local server) of the vendor location, causing a retail application hosted by the POS system to store the record in a local data storage (e.g., a hard disk drive, an SD card). Meanwhile, the location-triggered gift process may charge an account of the first user for creating the location-triggered benefit. For example, the first user may request a $20 gift card from a particular vendor. The location-triggered gift process can charge a $20 credit (payable to the particular vendor) to the first user's account. In some embodiments, the first user's account may be a credit card number provided by the first user. In other embodiments, the location-triggered gift process may access the first user's account by looking up a reference table (e.g., stored in a payment database of the social networking system or a third-party web site) that maps real currency to a credit account of the first user (e.g., PayPal, Facebook Credits).

Figure 2A:
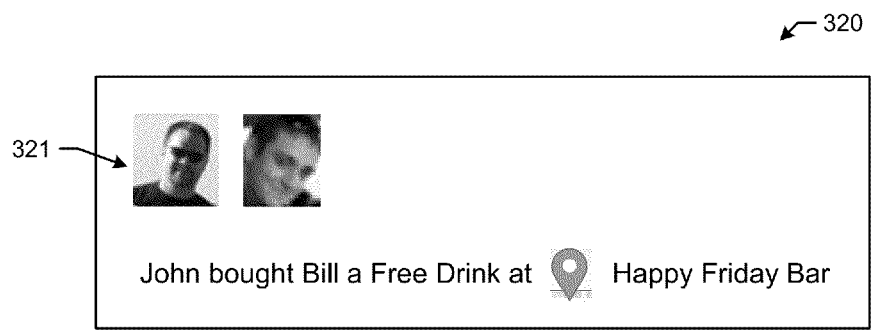
FIG. 2A illustrates an example news feed entry comprising information associated with a location-triggered benefit.

Additionally, in some embodiments, the location-triggered gift process may transmit to the second user a notification including information associated with the location-triggered benefit. For example, a notification may include the location-triggered benefit, the vendor location, and an user identifier (e.g., a name) of the first user (e.g., "John just bought you a free drink at Happy Friday Bar!"). For example, a notification may include the personal message from the first user to the second user (e.g., "I got a free latte for you at Café Du Nord.") as part of the first user's request to create the location-triggered benefit described earlier. The location-triggered gift process may transmit to the second user the notification via a private communication channel (e.g., an email, a voice mail, an SMS message). In one embodiment, the location-triggered gift process may cause news feed engine 110 to create a news feed entry comprising information associated with the location-triggered benefit, and add the news feed entry to a news feed for the second user's user profile page (and similarly to the first user's user profile page). FIG. 2A illustrates an example news feed entry 320 comprising information associated with a location-triggered benefit. For example, the example news feed entry 320 can include the first user's user identifier (e.g., John), the second user's user identifier (e.g., Bill), the benefit (e.g., a Free Drink), and the vendor location (e.g., Happy Friday Bar). The example news entry 320 may also include profile pictures (321) of the first user and the second user. The location-triggered gift process may cause news feed engine 110 to add the news feed entry for the location-triggered benefit to a news feed for the second user's user profile page (or the first user's user profile page) based on one or more privacy settings (e.g., stored in privacy database 103). For example, the first user may configure a privacy setting for the news feed entry such that the news feed entry is only readable for the second user's first-degree social contacts, and store the privacy setting in privacy database 103. For example, the second user may configure a privacy setting such that no news feed entry for location-triggered benefits can be displayed in the second user's profile page, and store the privacy setting in privacy database 103. Furthermore, the location-triggered gift process may provide additional incentive to the first user, if the first user elects (e.g., while requesting the location-triggered benefit) to publish the request (e.g., by posting to profile pages of the first user and the second user). For example, the location-triggered gift process may provide the same location-triggered benefit to the first user if the first user elects to publish the request to the profile pages of the first user and of the second user.

Figure 3:
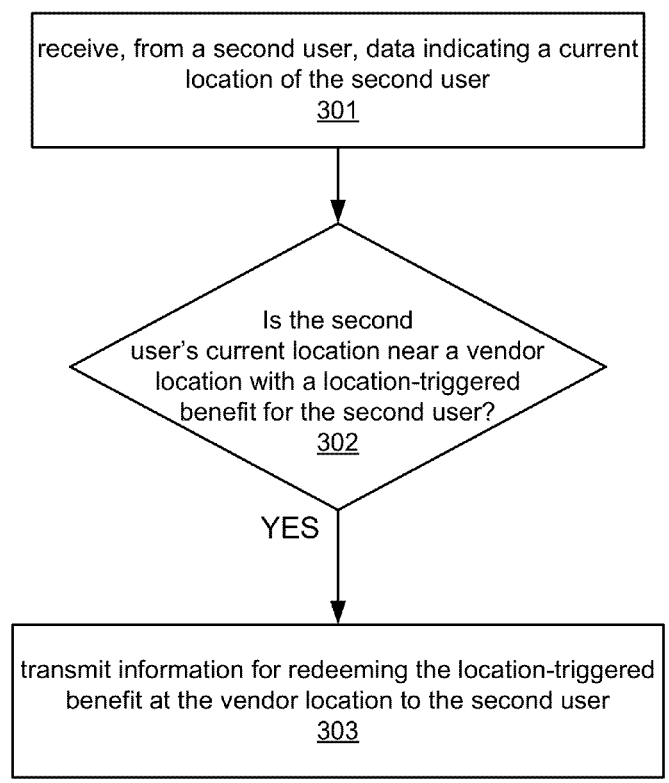
FIG. 3 illustrates an example method of transmitting a location-triggered benefit.

FIG. 3 illustrates an example method of transmitting a location-triggered benefit. In particular embodiments, the location-triggered gift process may receive, from a second user, data indicating a current location of the second user (301). For example, the location-triggered gift process can receive GPS coordinates transmitted from the second user's GPS-equipped mobile device. For example, the location-triggered gift process may receive from a server-side location check-in process a message including a location corresponding to a recent location check-in activity of the second user (e.g., a recent location check-in by the second user, or a recent location check-in of the second user by another user). Other methods for identifying the location of the second user may include data reports from POS systems or mobile devices of other users that have interacted with the second user's mobile phone via BlueTooth or Near-Field Communications (NFC) protocols.

In particular embodiments, the location-triggered gift process may determine whether a location-triggered benefit is accessible to the second user based at least in part on a determination whether the current location of the second user is at or near a vendor location with a location-triggered benefit configured for the second user (e.g., as specified individually or by the one or more configurable rules in the request of the location-triggered benefit). In particular embodiments, the location-triggered gift process may access location database 104, and determine whether the second user's current location is within a threshold distance (e.g., 300 feet) from a vendor location with a location-triggered benefit configured for the second user (302). That is, the location-triggered benefit associated with a vendor location can be accessible to the second user if the second user is at or near the vendor location.

In particular embodiments, the location-triggered gift process may transmit to the second user information for redeeming the location-triggered benefit at the vendor location if the location-triggered benefit is accessible to the second user (303). For example, the location-triggered gift process can transmit the information for redeeming the location-triggered benefit at the vendor location to the second user's mobile device, causing an application hosted by the second user's mobile device to display the information in a graphical user interface of the application. In particular embodiments, information for redeeming the location-triggered benefit may include a user identifier of the second user, the benefit, and the vendor location. Information for redeeming the location-triggered benefit may further include a coupon code, or a machine-readable, graphical symbol or other representation of data (e.g., a barcode, a QR code) for additional validation and record keeping of the benefit for the vendor. Information for redeeming the location-triggered benefit may also include the personal message from the first user to the second user (e.g., "Surprise!") as part of the first user's request for creating the location-triggered benefit described earlier. Information for redeeming the location-triggered benefit may also include a selectable link (e.g., "Buy your pal a drink here.") allowing the second user to create a location-triggered benefit for the first user or another user using the example method of FIG. 2. Furthermore, particular embodiments may automatically apply the location-triggered benefit to a current charge to the second user. For example, the second user may check out certain items with a current charge of $40 at a POS system of a particular vendor location. A retail application hosted by the POS system may detect the presence of the second user (e.g., via a credit card reader, or an NFC terminal coupled to the POS system), determine a location-triggered $20 gift card is accessible to the second user at the particular vendor location, and automatically apply the location-triggered $20 gift card to the current charge of $40, thus yielding a $20 balance for the second user at the POS system.

As discussed earlier with the example method of FIG. 2, the location-triggered gift process may charge an account of the first user for creating the location-triggered benefit when the first user acquires the location-triggered benefit. Alternatively, in one embodiment, the location-triggered gift process may charge an account of the first user when the second user redeems the location-triggered benefit at the vendor location. For example, the location-triggered gift process may include information of a chargeable account of the first user (e.g., a credit card number provided by the first user while requesting the location-triggered benefit) in the record for information associated with the location-triggered benefit for the second user (as described in the example method of FIG. 2). When the second user redeems the location-triggered benefit at a POS system at the vendor location for the location-triggered benefit, a retail application hosted by the POS system may transmit the transaction to the social networking system, causing the location-triggered gift process to charge the first user's chargeable account for creating the location-triggered benefit.

In particular embodiments, when the second user redeems the location-triggered benefit (or when the location-triggered gift process transmits to the second user information for redeeming the location-triggered benefit at the vendor location), the location-triggered gift process may transmit a notification to the first user about the location-triggered benefit being redeemed by the second user (or transmitted to the second user). For example, as the second user redeems the location-triggered benefit at the vendor location, a retail application hosted by the POS system at the vendor location may transmit to the social networking system a message indicating the second user having redeemed the location-triggered benefit, causing the location-triggered gift process to send a message (e.g., "Louis just got your gift at Café Du Nord") to the first user via a private communication channel (e.g., an email, a voice mail, an SMS message). In one embodiment, the location-triggered gift process may cause news feed engine 110 to create a news feed entry including information about the second user receiving the location-triggered benefit from the first user (e.g., "Jim just bought Louis a drink at Café Du Nord"), and add the news feed entry to a news feed for the first user's profile page (and similarly to a news feed for the second user's profile page). In some embodiments, the second user may compose a thank-you message to the first user. For example, upon receiving information for redeeming the location-triggered benefit transmitted to the second user's mobile device, the second user can use a special-purpose client application running on the mobile device to compose and transmit a thank-you message to the social networking system, causing the location-triggered gift process to transmit a private thank-you message (e.g., an email, an SMS message, etc.) to the first user, or causing the news feed engine 110 to create a news feed entry comprising the thank-you message, and add the news feed entry to the first user's profile page. For example, the news feed engine 110 can add a comment comprising the thank-you message to the news feed entry about the first user's purchasing a location-triggered benefit for the second user (e.g., as illustrated in FIG. 2A).

In addition to a vendor location, a first user may include other locations as conditions for a second user to retrieve a location-triggered benefit. For example, a parent may request to create a gift certificate (e.g., for his teenage son), including a vendor location (e.g., McDonald's), three pre-requisite locations (e.g., school, library, piano teacher's house) and a personal message (e.g., "Go to school, go to library, take piano lesson, then you can have burgers at McDonald's."). The location-triggered gift process can create a corresponding record based on the request, store the record in location database 104, and transmit the personal message to the teenage son's GPS-equipped mobile phone. The location-triggered gift process may access location database 104 for the teenage son's location data (e.g., location data transmitted from the teenage son's GPS-equipped mobile phone). If the location-triggered gift process determines that the teenage son has been to the three pre-requisite locations, and the teenage son's current location is at or near a McDonald's store, the location-triggered gift process may transmit the gift certificate (e.g., a QR code) to the teenage son's mobile phone.

Figure 4:
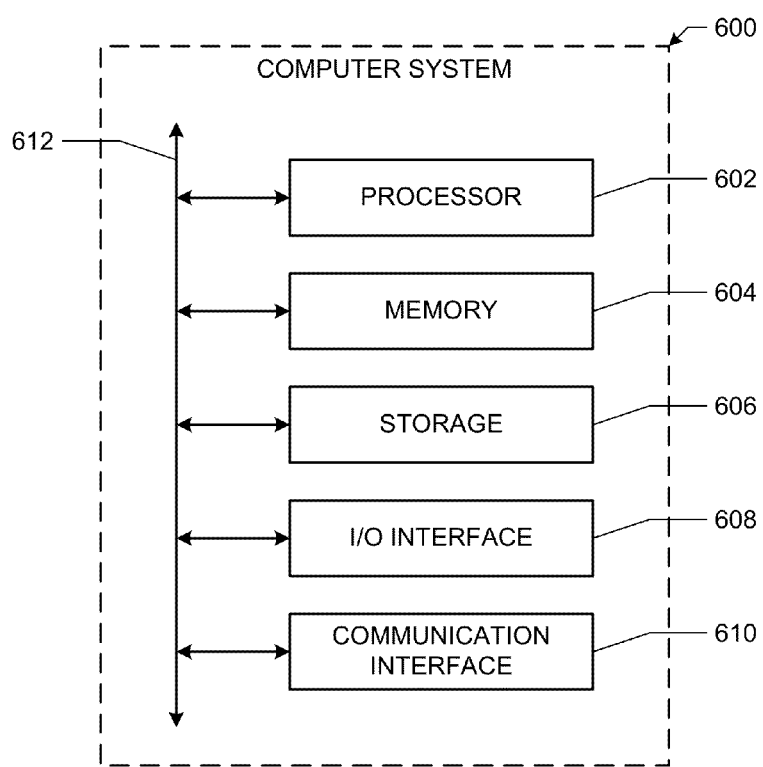
FIG. 4 illustrates an example computer system.

FIG. 4 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a desktop computer system, a mobile computer system, a game console, a mainframe, a mesh of computer systems, a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. In particular embodiments, memory 604 includes main memory for storing instructions for processor 602 to execute or data for processor 602 to operate on. As an example and not by way of limitation, computer system 600 may load instructions from storage 606 to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM).

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), or flash memory or a combination of two or more of these.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, microphone, display, touch screen, mouse, speaker, camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) for communicating with an Ethernet or other wire-based network or a wireless NIC (WNIC) for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (e.g., a BLUETOOTH WPAN), a WI-FI network (e.g., a 802.11a/b/g/n WI-FI network,), a WI-MAX network, a cellular telephone network (e.g., a Global System for Mobile Communications (GSM) network, a Long Term Evolution (LTE) network), or other suitable wireless network or a combination of two or more of these.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an INFINIBAND interconnect, a low-pin-count (LPC) bus, a memory bus, a Peripheral Component Interconnect Express or PCI-Express bus, a serial advanced technology attachment (SATA) bus, a Inter-Integrated Circuit ($I^2C$) bus, a Secure Digital (SD) memory interface, a Secure Digital Input Output (SDIO) interface, a Universal Serial Bus (USB) bus, a General Purpose Input/Output (GPIO) bus, or another suitable bus or a combination of two or more of these. Bus 612 may include one or more buses 612, where appropriate.

Figure 5:
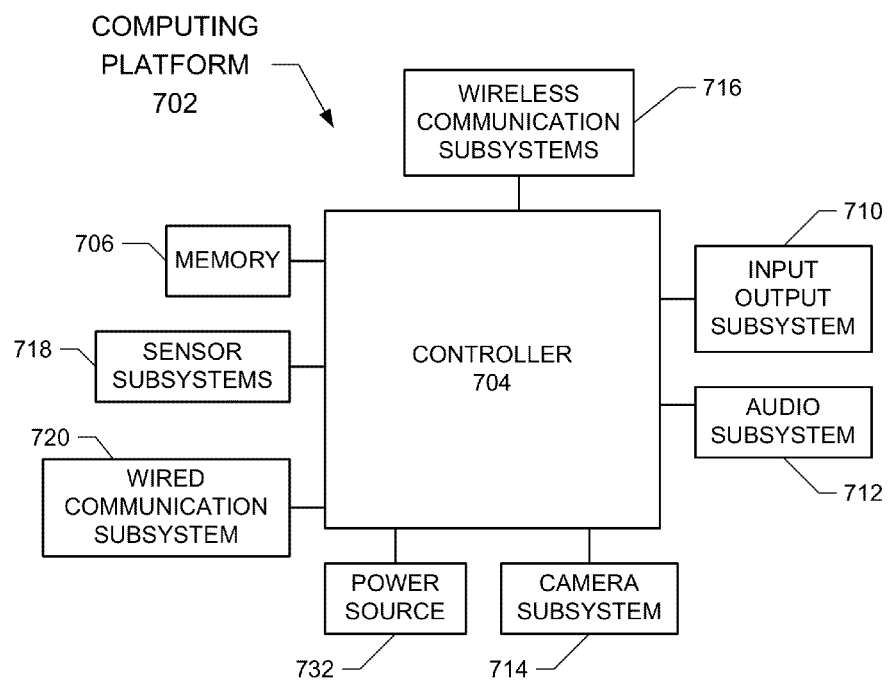
FIG. 5 illustrates an example mobile device platform.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 5 shows a schematic representation of the main components of an example computing platform of a client or mobile device, according to various particular embodiments. In particular embodiments, computing platform 702 may comprise controller 704, memory 706, and input output subsystem 710. In particular embodiments, controller 704 which may comprise one or more processors and/or one or more microcontrollers configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702. By way of example, controller 704 may include one or more processors or one or more controllers dedicated for certain processing tasks of computing platform 702, for example, for 2D/3D graphics processing, image processing, or video processing.

Controller 704 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 706 that is operatively coupled to controller 704.

Memory 706 may encompass one or more storage media and generally provide a place to store computer code (e.g., software and/or firmware) and data that are used by computing platform 702. By way of example, memory 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory 706 may also include one or more fixed storage devices in the form of, by way of example, hard disk drives (HDDs), solid-state drives (SSDs), flash-memory cards (e.g., Secured Digital or SD cards), among other suitable forms of memory coupled bi-directionally to controller 704. Information may also reside on one or more removable storage media loaded into or installed in computing platform 702 when needed. By way of example, any of a number of suitable memory cards (e.g., SD cards) may be loaded into computing platform 702 on a temporary or permanent basis.

Input output subsystem 710 may comprise one or more input and output devices operably connected to controller 704. For example, input output subsystem may include keyboard, mouse, one or more buttons, and/or, display (e.g., liquid crystal display (LCD), or any other suitable display technology). Generally, input devices are configured to transfer data, commands and responses from the outside world into computing platform 702. The display is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 710 may also include touch based devices such as touch pad and touch screen. A touchpad is an input device including a surface that detects touch-based inputs of users. Similarly, a touch screen is a display that detects the presence and location of user touch inputs. Input output system 710 may also include dual touch or multi-touch displays or touch pads that can identify the presence, location and movement of more than one touch inputs, such as two or three finger touches.

In particular embodiments, computing platform 702 may additionally comprise audio subsystem 712, camera subsystem 712, wireless communication subsystem 716, sensor subsystems 718, and/or wired communication subsystem 720, operably connected to controller 704 to facilitate various functions of computing platform 702. For example, Audio subsystem 712, including a speaker, a microphone, and a codec module configured to process audio signals, can be utilized to facilitate voice-enabled functions, such as voice recognition, voice replication, digital recording, and telephony functions. For example, camera subsystem 712, including an optical sensor (e.g., a charged coupled device (CCD), image sensor), can be utilized to facilitate camera functions, such as recording photographs and video clips. For example, wired communication subsystem 720 can include a Universal Serial Bus (USB) port for file transferring, or a Ethernet port for connection to a local area network (LAN). Additionally, computing platform 702 may be powered by power source 732.

Wireless communication subsystem 716 can be designed to operate over one or more wireless networks, for example, a wireless PAN (WPAN) (e.g., a BLUETOOTH), a WI-FI network (e.g., an 802.11a/b/g/n network), a WI-MAX network, a cellular telephone network (such as, for example, a Global System for Mobile Communications (GSM) network, a Long Term Evolution (LTE) network). Additionally, wireless communication subsystem 716 may include hosting protocols such that computing platform 702 may be configured as a base station for other wireless devices. Other input/output devices may include an accelerometer that can be used to detect the orientation of the device.

Sensor subsystem 718 may include one or more sensor devices to provide additional input and facilitate multiple functionalities of computing platform 702. For example, sensor subsystems 718 may include GPS sensor for location positioning, altimeter for altitude positioning, motion sensor for determining orientation of a mobile device, light sensor for photographing function with camera subsystem 714, temperature sensor for measuring ambient temperature, and/or biometric sensor for security application (e.g., fingerprint reader).

In particular embodiments, various components of computing platform 702 may be operably connected together by one or more buses (including hardware and/or software). As an example and not by way of limitation, the one or more buses may include an Accelerated Graphics Port (AGP) or other graphics bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Peripheral Component Interconnect Express PCI-Express bus, a serial advanced technology attachment (SATA) bus, a Inter-Integrated Circuit (I$^2$C) bus, a Secure Digital (SD) memory interface, a Secure Digital Input Output (SDIO) interface, a Universal Serial Bus (USB) bus, a General Purpose Input/Output (GPIO) bus, an Advanced Microcontroller Bus Architecture (AMBA) bus, or another suitable bus or a combination of two or more of these. Additionally, computing platform 702 may be powered by power source 732.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
    by one or more computing devices, receiving, from a first user, the first user being independent of a vendor, a request to create a location-triggered benefit associated with a second user, the second user being selected by the first user, and a current location of the first user, wherein the current location of the first user is associated with a vendor location of a vendor;
    by one or more computing devices, creating a record in a database including information associated with the location-triggered benefit for the second user;
    by one or more computing devices, receiving, from the second user, data indicating a current location of the second user;
    by one or more computing devices, determining whether the location-triggered benefit is accessible to the second user based at least in part on a determination whether the current location of the second user is at or near the vendor location; and
    by one or more computing devices, sending information for redeeming the location-triggered benefit at the vendor location to the second user if the location-triggered benefit is accessible to the second user.

2. The method of claim 1, wherein the creating a record in a database including information associated with the location-triggered benefit for the second user, comprises:
    comparing the current location of the first user to the vendor location; and
    creating a record in a database including information associated with the location-triggered benefit for the second user, if the current location of the first user is within a threshold distance of the vendor location.

3. The method of claim 1, wherein the creating a record in a database including information associated with the location-triggered benefit for the second user, further comprises:
    sending to the second user a notification including information associated with the location-triggered benefit.

4. The method of claim 1, wherein the location-triggered benefit is redeemable at the vendor location.

5. The method of claim 1, wherein the location-triggered benefit is a credit redeemable from the vendor.

6. The method of claim 1, wherein the location-triggered benefit is a coupon redeemable from the vendor.

7. The method of claim 1, wherein the location-triggered benefit is a gift voucher redeemable from the vendor.

8. The method of claim 1, wherein the location-triggered benefit is a discount on products or services from the vendor.

9. The method of claim 1, wherein the location-triggered benefit has an effective time duration.

10. The method of claim 1, further comprising:
    charging an account of the first user for creating the location-triggered benefit.

11. The method of claim 10, wherein the charging an account of the first user for creating the location-triggered benefit occurs when the second user redeems the location-triggered benefit.

12. A system comprising:
a memory;
one or more processors; and
a non-transitory storage medium storing computer-readable instructions operative, when executed, to cause the one or more processors to:
receive, from a first user, the first user being independent of a vendor, a request to create a location-triggered benefit associated with a second user, the second user being selected by the first user, and a current location of the first user, wherein the current location of the first user is associated with a vendor location of a vendor;
create a record in a database including information associated with the location-triggered benefit for the second user;
receive, from the second user, data indicating a current location of the second user;
determine whether the location-triggered benefit is accessible to the second user based at least in part on a determination whether the current location of the second user is at or near the vendor location; and
send information for redeeming the location-triggered benefit at the vendor location to the second user if the location-triggered benefit is accessible to the second user.

13. The system of claim 12, wherein to create a record in a database including information associated with the location-triggered benefit for the second user, further comprises instructions operable to cause the one or more processors to:
compare the current location of the first user to the vendor location; and
create a record in a database including information associated with the location-triggered benefit for the second user, if the current location of the first user is within a threshold distance of the vendor location.

14. The system of claim 12, wherein to create a record in a database including information associated with the location-triggered benefit for the second user, further comprises instructions operable to cause the one or more processors to:
send to the second user a notification including information associated with the location-triggered benefit.

15. The system of claim 12, wherein the location-triggered benefit is redeemable at the vendor location.

16. One or more non-transitory computer-readable tangible storage media embodying software operable when executed by one or more computing devices to:
receive, from a first user, the first user being independent of a vendor, a request to create a location-triggered benefit associated with a second user, the second user being selected by the first user, and a current location of the first user, wherein the current location of the first user is associated with a vendor location of a vendor;
create a record in a database including information associated with the location-triggered benefit for the second user;
receive, from the second user, data indicating a current location of the second user;
determine whether the location-triggered benefit is accessible to the second user based at least in part on a determination whether the current location of the second user is at or near the vendor location; and
send information for redeeming the location-triggered benefit at the vendor location to the second user if the location-triggered benefit is accessible to the second user.

17. The media of claim 16, wherein to create a record in a database including information associated with the location-triggered benefit for the second user, further comprises software operable when executed by one or more computing devices to:
compare the current location of the first user to the vendor location; and
create a record in a database including information associated with the location-triggered benefit for the second user, if the current location of the first user is within a threshold distance of the vendor location.

18. The media of claim 16, wherein to create a record in a database including information associated with the location-triggered benefit for the second user, further comprises software operable when executed by one or more computing devices to:
send to the second user a notification including information associated with the location-triggered benefit.

19. The media of claim 16, wherein the location-triggered benefit is redeemable at the vendor location.

20. The media of claim 16, wherein the location-triggered benefit has an effective time duration.

* * * * *